(12) United States Patent
Lim et al.

(10) Patent No.: US 8,350,874 B2
(45) Date of Patent: Jan. 8, 2013

(54) MOBILE TERMINAL AND METHOD OF CONTROLLING A DISPLAY DEVICE

(75) Inventors: Sang Yeon Lim, Gyeonggi-do (KR); Yeon Woo Park, Seoul (KR); Young Suk Oh, Seoul (KR); Huhn Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 917 days.

(21) Appl. No.: 11/751,486

(22) Filed: May 21, 2007

(65) Prior Publication Data

US 2007/0268202 A1 Nov. 22, 2007

(30) Foreign Application Priority Data

May 22, 2006 (KR) .................. 10-2006-0045627

(51) Int. Cl.
*G09G 5/02* (2006.01)
(52) U.S. Cl. ................ 345/690; 345/4; 345/5; 362/257; 362/311.01
(58) Field of Classification Search .................. None
See application file for complete search history.

(56) References Cited

U.S. PATENT DOCUMENTS

| | | | | |
|---|---|---|---|---|
| 5,353,016 A | * | 10/1994 | Kurita et al. | 340/825.22 |
| 5,691,786 A | | 11/1997 | Nakai | |
| 5,691,788 A | | 11/1997 | Kim | |
| 5,870,110 A | * | 2/1999 | Mallory | 345/168 |
| 6,009,338 A | | 12/1999 | Iwata | |
| 6,046,849 A | * | 4/2000 | Moseley et al. | 359/465 |
| 6,718,611 B1 | * | 4/2004 | Lai | 29/412 |
| 2003/0016316 A1 | * | 1/2003 | Sahouani et al. | 349/96 |
| 2003/0065590 A1 | | 4/2003 | Haeberli | |
| 2003/0146920 A1 | * | 8/2003 | Tezuka et al. | 345/629 |
| 2004/0201578 A1 | * | 10/2004 | Sadahiro | 345/173 |
| 2005/0074184 A1 | * | 4/2005 | Matsumoto et al. | 382/284 |
| 2005/0140613 A1 | | 6/2005 | Lowe | |

FOREIGN PATENT DOCUMENTS

| | | |
|---|---|---|
| CN | 1257391 | 6/2000 |
| CN | 1652286 | 8/2005 |
| EP | 1429544 | 6/2004 |
| KR | 1020040016788 | 2/2004 |
| WO | 03/001286 | 1/2003 |

* cited by examiner

*Primary Examiner* — Sumati Lefkowitz
*Assistant Examiner* — Jesus Hernandez
(74) *Attorney, Agent, or Firm* — Lee, Hong, Degerman, Kang & Waimey

(57) ABSTRACT

A mobile terminal and method of controlling a display device are provided. The present invention includes a display unit displaying information and a control unit controlling the display of the information according to whether luminescence conversion is performed, the luminescence conversion converting a plane luminescence of the display unit to a plurality of dot luminescences. A user can be provided with a substantially analog type information display as well as a digital type information display by loading the luminescence converting unit, such as a plate having a plurality of holes and a semi-transparent film, on a display unit of a mobile terminal or by displaying an image having a configuration of the plate.

13 Claims, 12 Drawing Sheets

MOBILE TERMINAL AND METHOD OF CONTROLLING A DISPLAY DEVICE

This application claims the benefit of the Korean Patent Application No. 10-2006-0045627, filed on May 22, 2006, which is hereby incorporated by reference as if fully set forth herein.

FIELD OF THE INVENTION

The present invention is directed to a mobile terminal and method of controlling a display device. Although the present invention is suitable for a wide scope of applications, it is particularly suitable for providing a new information display type.

DESCRIPTION OF THE RELATED ART

Recent technical hardware and software developments enable a mobile or portable terminal to provide a user with various functions. A single mobile terminal may perform a communication function, such as voice communication or video communication, a multimedia function, such as a game function, a music function, or a movie function, a navigation function, a broadcast receiving function and a camera function.

An information display is mandatory for most of the various functions. Therefore, recently marketed mobile terminals are provided with a display device capable of implementing clear and clean image quality by supporting high resolution.

However, a fixed type digital display device may bring a trite feeling to a user since different users may prefer a different type of display devices. Specifically, mobile terminals generally are provided with at least two display devices. Therefore, one of the at least two display devices must be implemented in a different way.

SUMMARY OF THE INVENTION

An object of the present invention is to provide a display device by which a digital display type can be converted to an analog display type by providing a luminescence converting unit to convert a plane luminescence of a display unit to a plurality of dot luminescences. Another object of the present invention is to provide a mobile terminal by which a display type of information displayed on a display unit can be controlled such that it is suitable for an analog display type when a plane luminescence of the display unit is converted to a plurality of dot luminescences. Another object of the present invention is to provide a method of controlling a mobile terminal by which a display type of information displayed within a background can be controlled such that it is suitable for an analog type when displaying an image for converting a plane luminescence of a display unit to a plurality of dot luminescences as the background on the display unit.

In one aspect of the present invention, a display device is provided. The display device includes a display unit displaying information and a luminescence conversion means on the display unit converting a plane luminescence of the display unit to a plurality of dot luminescences.

It is contemplated that the luminescence conversion means includes a luminescence converting unit installed on the display unit. It is further contemplated that the display unit includes at least one protrusion, the at least one protrusion including a groove in which the luminescence converting unit is detachably installed.

It is contemplated that the luminescence converting unit includes one of a plate having a plurality of holes and a semitransparent film partially transmitting light. It is further contemplated that the luminescence conversion means includes an image displayed as a background of the display unit.

In another aspect of the present invention, a mobile terminal is provided. The mobile terminal includes a display unit displaying information and a control unit controlling the display of the information according to whether luminescence conversion is performed, the luminescence conversion converting a plane luminescence of the display unit to a plurality of dot luminescences.

It is contemplated that the mobile terminal further includes a detecting unit detecting the presence of a luminescence converting unit and providing an indication of the detection to the controller, the luminescence converting unit performing luminescence conversion. It is further contemplated that the display unit includes at least one protrusion, the at least one protrusion including a groove in which the luminescence converting unit is detachably installed.

It is contemplated that the luminescence converting unit includes one of a plate having a plurality of holes and a semitransparent film partially transmitting light. It is further contemplated that he mobile terminal further includes a storage unit storing at least one luminescence conversion image and an input unit receiving an input selecting one of the at least one luminescence conversion image, wherein the control unit displays the selected luminescence conversion image as a background of the display unit.

It is further contemplated that the at least one luminescence conversion image includes a plate shape with a plurality of holes. It is further contemplated that the information includes at least one of a character, an image, and an icon.

It is contemplated that the control unit enlarges a display size of the information if luminescence conversion is performed. It is further contemplated that the control unit scrolls the information in a preset direction if luminescence conversion is performed.

It is contemplated that the control unit blinks the information for a preset duration if luminescence conversion is performed. It is further contemplated that the control unit changes a brightness of the information if luminescence conversion is performed.

In another aspect of the present invention, a method of controlling the display of information in a mobile terminal is provided. The method includes displaying information on a display unit and controlling the display of the information according to whether luminescence conversion is performed, the luminescence conversion converting a plane luminescence of the display unit to a plurality of dot luminescences.

It is contemplated that the method further includes detecting whether a luminescence converting unit is present on the display unit. It is further contemplated that the method includes storing at least one luminescence conversion image, receiving an input selecting one of the at least one luminescence conversion image and displaying the selected luminescence conversion image as a background of the display unit.

It is contemplated that the at least one luminescence conversion image includes a plate shape with a plurality of holes. It is further contemplated that the information includes at least one of a character, an image, and an icon.

It is contemplated that controlling the display of the information includes enlarging a display size of the information if luminescence conversion is performed. It is further contemplated that controlling the display of the information includes scrolling the information in a preset direction if luminescence conversion is performed.

It is contemplated that controlling the display of the information includes blinking the information for a preset duration if luminescence conversion is performed. It is further contemplated that controlling the display of the information includes changing a brightness of the information if luminescence conversion is performed.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention is applicable to various terminals, such as a digital broadcast receiving terminal, a PDA, a mobile phone, an MP3, a PMP, a digital camera, a camcorder, or a game player. Specifically, the present invention is applicable to any terminal provided with a display device that displays information.

For convenience of explanation, it is assumed in the following description that the present invention is applied to a mobile terminal. A mobile terminal according to the present invention includes at least one display device. Furthermore, the present invention is applicable to various mobile terminal types, including a folder type, a slide type, a bar type, and a swing type. For example, a folder type mobile terminal according to the present invention can include a pair of display devices.

Embodiments in the following detailed disclosure of the present invention are explained using a folder type mobile terminal, as an example. However, it is apparent that the present invention is not limited to a folder type mobile terminal.

Figure 1:
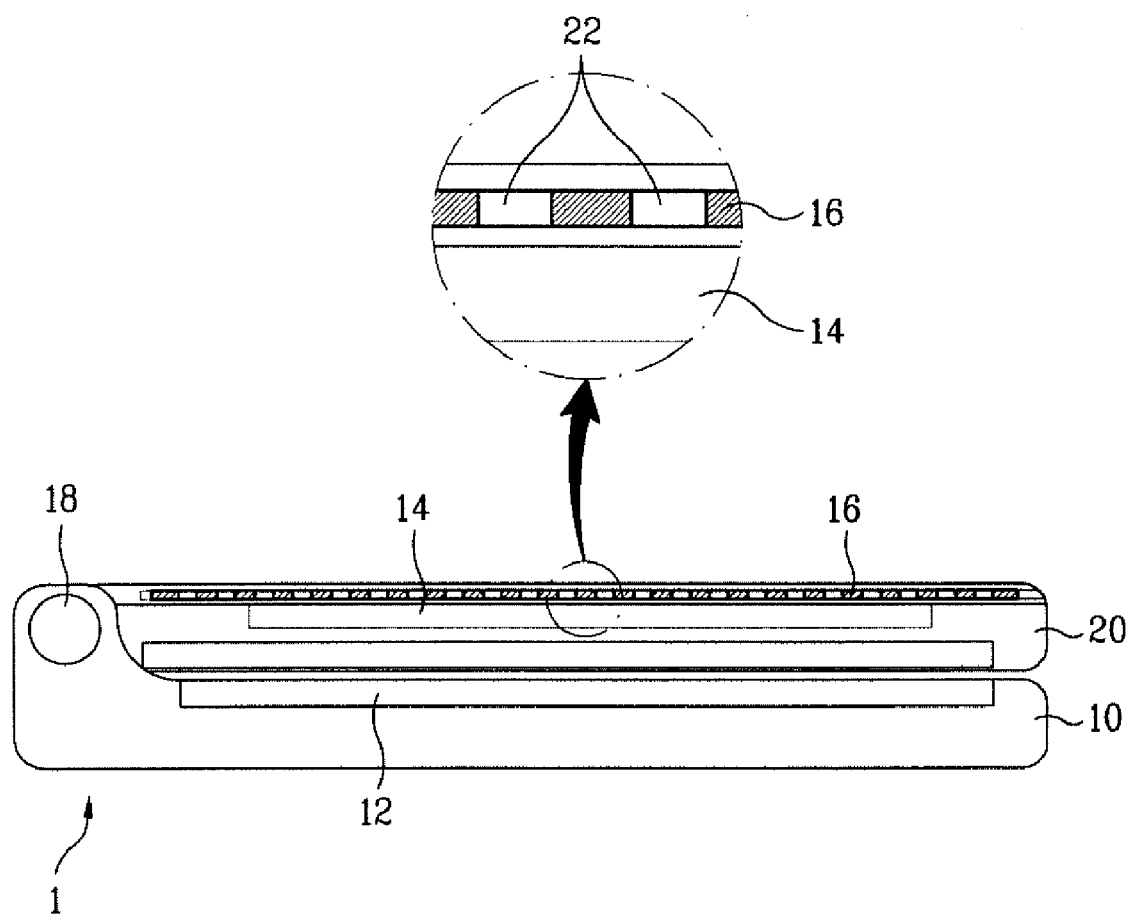
FIG. 1 is a cross-sectional diagram of a mobile terminal provided with a display device according to the present invention.

FIG. 1 is a cross-sectional diagram of a mobile terminal 1 provided with a display device according to the present invention. As illustrated in FIG. 1, the mobile terminal 1 includes a first body 10, a second body 20, a first display unit 12, a second display unit 14, a plate 16, and a joining unit 18.

Each of the first 12 and second 14 display units includes a display device that displays status of the mobile terminal 1 or various types of information. Specifically, each of the first 12 and second 14 display units can be implemented with an EL (electroluminescent) display panel or a LCD (liquid crystal display) panel.

The first display unit 12 is located on the first body 10 and the second display unit 14 is located on an outer surface of the second body 20, as illustrated in FIG. 1. The joining unit 18 is a device to join the first 10 and second 20 bodies together.

The plate 16, which functions as a luminescence converting unit of the present invention, converts a plane luminescence of either the first 12 or second 14 display unit to a plurality of dot luminescences. The plate 16 is illustrated in FIG. 1 mounted on the second display unit 14.

A portion of the information displayed on the second display unit 14 is covered with the plate 16 mounted on the second display unit, while the rest of the information is externally exposed after the plate converts the plane luminescence of the second display unit to a plurality of dot luminescences. Specifically, a digital display type of the second display unit 14 is converted to an analog display type by the luminescence conversion of the plate 16.

A plurality of holes 22 are provided on the plate 16 and the plate is detachably mounted on the second display unit 14. In this way, the plate 16 blocks a portion of the information displayed on the second display unit 14 while the rest of the information is exposed via the plurality of holes 22.

A device to mount/attach the plate 16 to the second display unit 14 is required. The fixing device can be implemented in various ways.

Figure 2:
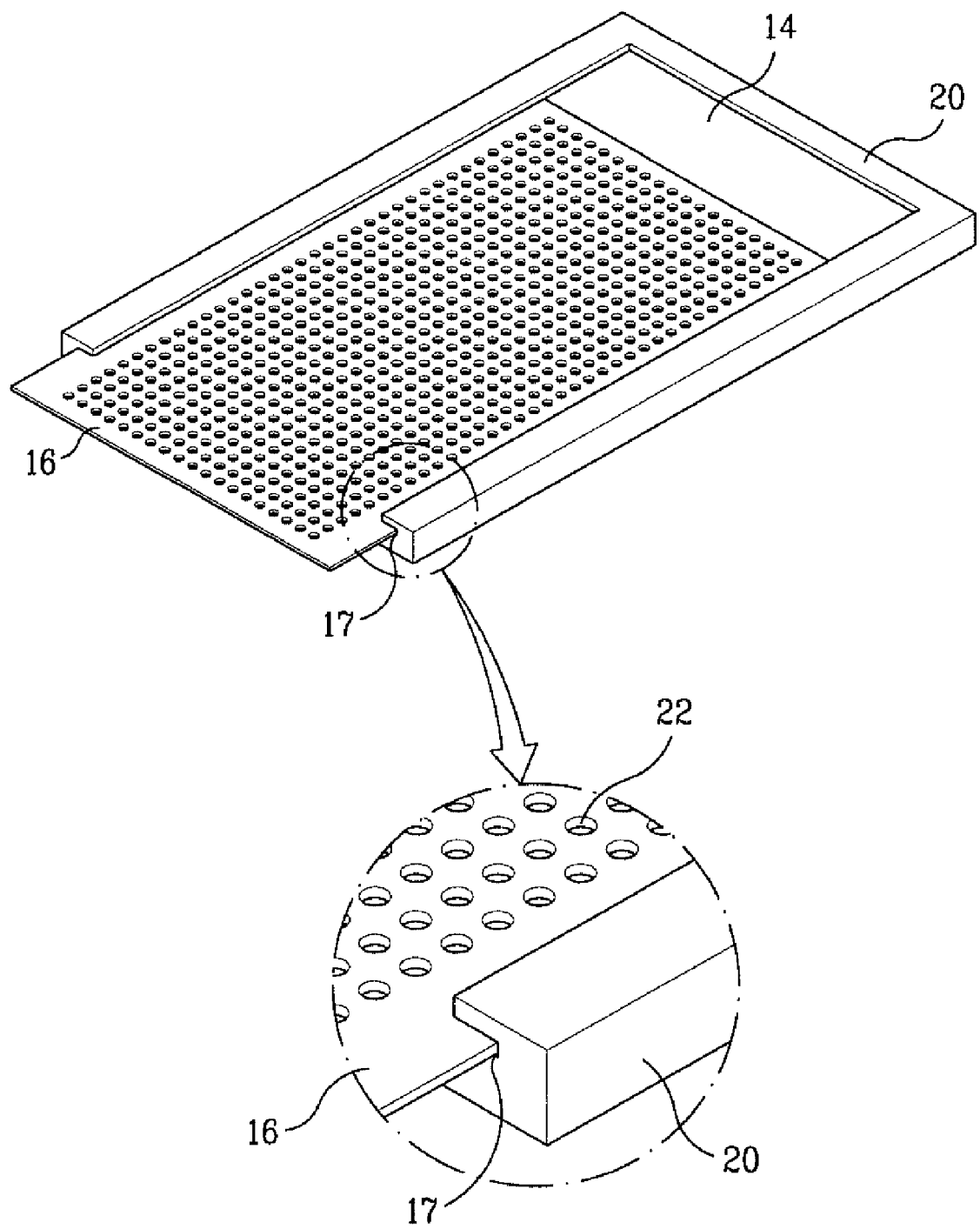
FIG. 2 is a perspective diagram of a plate of a display device according to the present invention.

FIG. 2 illustrates a slide type fixing device. As illustrated in FIG. 2, a protrusion is provided in an outer surface of the second body 20, the protrusion having a groove 17 for fixing the plate 16 thereto.

Figure 3:
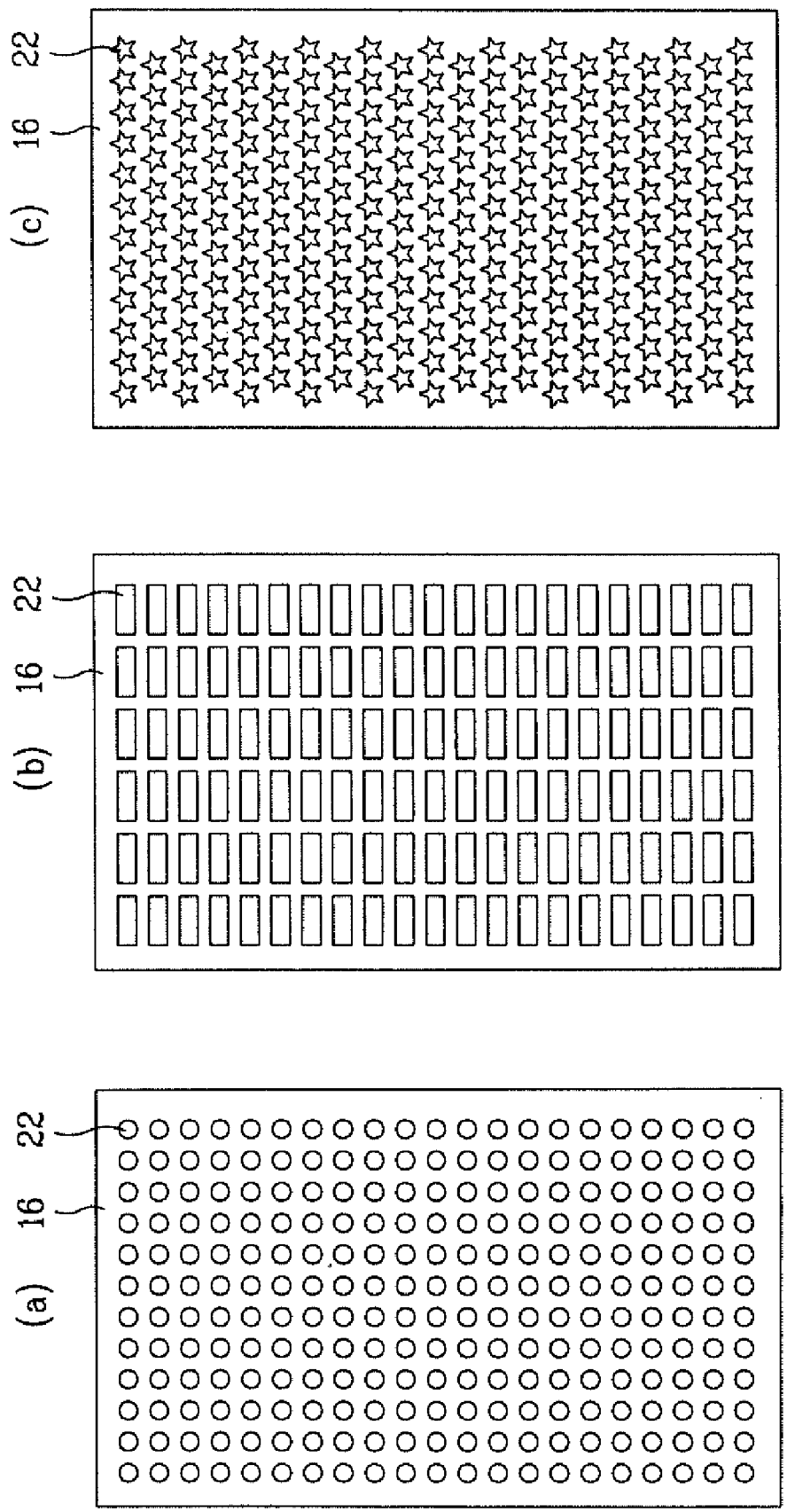
FIGS. 3A to 3C are layouts of plates applicable to the present invention.

The plate 16 is inserted or removed along the groove 17 in order to mount and dismount the plate from the second body 20 and the second display unit 14. The plate 16 can have the plurality of holes 22 arranged with various patterns in a matrix form, as illustrated in FIGS. 3A to 3C.

The plate 16 can be formed of various substances, such as steel, acryl, or enamel film. The plate 16 can employ a luminescence converting unit having various patterns to convert a plane luminescence to a plurality of dot luminescences.

Figure 4:
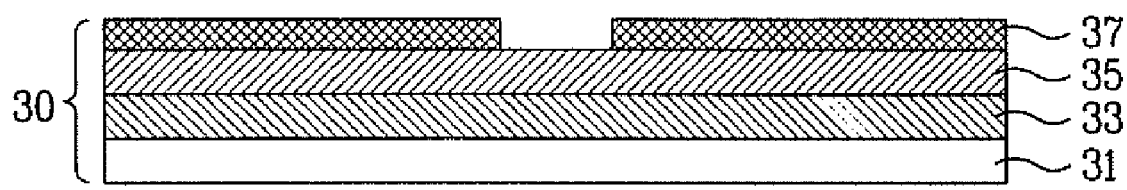
FIG. 4 is a cross-sectional diagram of a semitransparent film applicable to the present invention.

FIG. 4 is a cross-sectional diagram of a semitransparent film 30 applicable to the present invention. As illustrated in FIG. 4, the semitransparent film 30 includes a PET (polyethylene teraphthalate) film 31, a PVC (polyvinyl chloride) film 33, an optical diffusing PVA (polyvinyl acetate) coating layer 35, and a shield coating layer 37. Preferably, the semitransparent film 30 has 40~70% opaqueness, 80~100% whiteness, 30~60% total ray reflectivity, and 30~70% total ray average transmittance.

The shield coating layer 37 plays a role in converting a plane luminescence to a plurality of dot luminescences. Specifically, a portion of the semitransparent film 30 having the shield coating layer 37 partially transmits the light emitted from the second display unit 14 whereas the rest of the semitransparent film not having the shield coating layer transmits the light emitted from the second display unit intact. The portion of the semitransparent film 30 not having the shield coating layer 37 corresponds to the plurality of holes 22 provided in the plate 16.

The semitransparent film 30 illustrated in FIG. 4 includes a portion of the semitransparent film actually mounted on the second display unit 14. Specifically, the substantially mounted semitransparent film 30 includes a plurality of the portions not having the shield coating layer 37.

Figure 5:
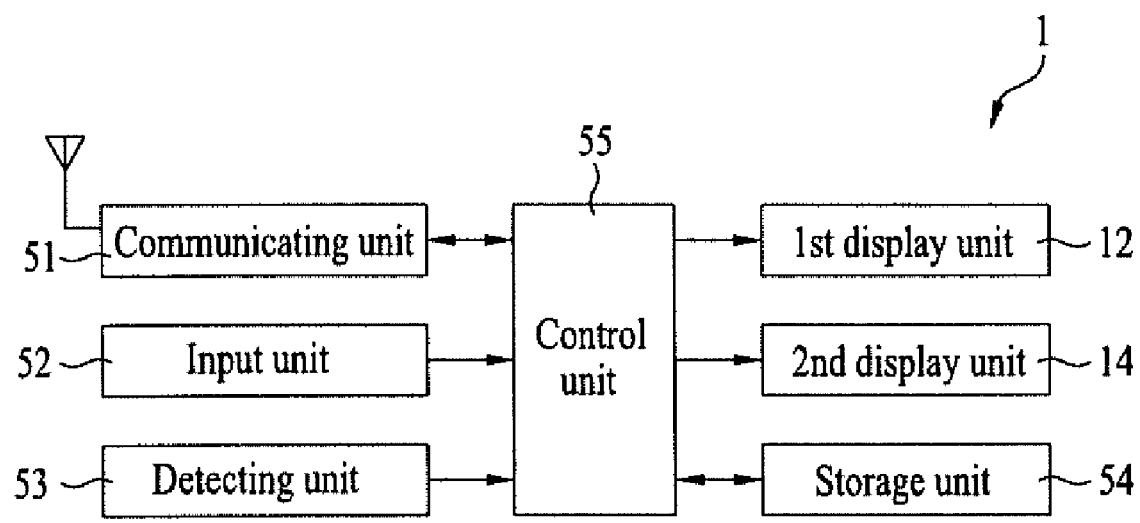
FIG. 5 is a block diagram of a mobile terminal provided with a display device according to the present invention.

An operation of controlling an information display type of a mobile terminal provided with the display device 1 having the luminescence converting unit, such as the plate 16 and the semitransparent film 30, is explained in detail with reference to FIG. 5. FIG. 5 is a block diagram of a mobile terminal 1 provided with a display device according to the present invention.

As illustrated in FIG. 5, the mobile terminal 1 includes a communicating unit 51, an input unit 52, a detecting unit 53, a storage unit 54, a first display unit 12 having a detachable luminescence converting unit, a second display unit 14 having another detachable luminescence converting unit and a control unit 55.

The mobile terminal 1 may be provided with other various additional elements, such as, a battery unit, as well as the aforesaid elements. Since the additional elements are not directly associated with the present invention, detailed explanations will be omitted in the following description for concise explanation of the present invention. Furthermore, at least two of the above elements may be grouped into one element or one of the above elements may be divided into at least two elements according to necessity for actual implementations.

The communicating unit 51 exchanges signals with a mobile communication network via transmissions and receptions. Specifically, the communicating unit 51 modulates a signal generated under the control of the control unit 55 into a radio signal and then transmits the radio signal to the mobile network via a base station. The communicating unit 51 also demodulates a radio signal received from the mobile communication network via a base station.

The input unit 52 is an input means for receiving various types of information or commands from a user. The input unit 52 includes a plurality of numeral keys and function keys. The input unit 52 outputs key signals for the keys to the control unit 55.

The input unit 52 may include a touch pad or a touch screen according to a configuration of the mobile terminal 1 according to the present invention. The input unit 52 may include a direction key, a rotary key, a scroll key, a jog shuttle, or a jog dial such that a user may input a direction.

The detecting unit 53 detects whether the luminescence converting unit of the present invention is mounted on the first display unit 12 or the second display unit 14. The detection unit 53 then outputs a signal according to the detection.

The detecting unit 53 may have various configurations. For example, the detecting unit 53 may have a configuration of a button within the groove 17 of the plate 16. Installation of the plate 16 is detected when the plate is fitted into the groove 17 and the plate presses the button.

The storage unit 54 stores various programs for controlling overall operations of the mobile terminal 1 and various types of data stored and retrieved during operation of the mobile terminal. Furthermore, an image to convert a plane luminescence of the first 12 or second 14 display unit to a plurality of dot luminescences may be stored in the storage unit 54.

Preferably, the image has a configuration of a plate 16 having a plurality of holes 22 to replace a luminescence switching unit of the present invention. Details of the image will be explained with respect to a second embodiment of the present invention.

Each of the first 12 and second 14 display units includes a display device. Each of the first 12 and second 14 display units displays data corresponding to a key signal of the input unit 52 and represents an operational status and a plurality of information as icons and text. Each of the first 12 and second 14 display units also enables a luminescence converting unit to be detachably installed.

The control unit 55 controls overall operation of the mobile terminal 1. Specifically, the control unit 55 performs a method of controlling an information display type, which is explained in detail with reference to FIGS. 6 and 7. It is assumed that a luminescence converting unit is loaded in either the first display unit 12 or the second display unit 14.

First Embodiment

Figure 6:
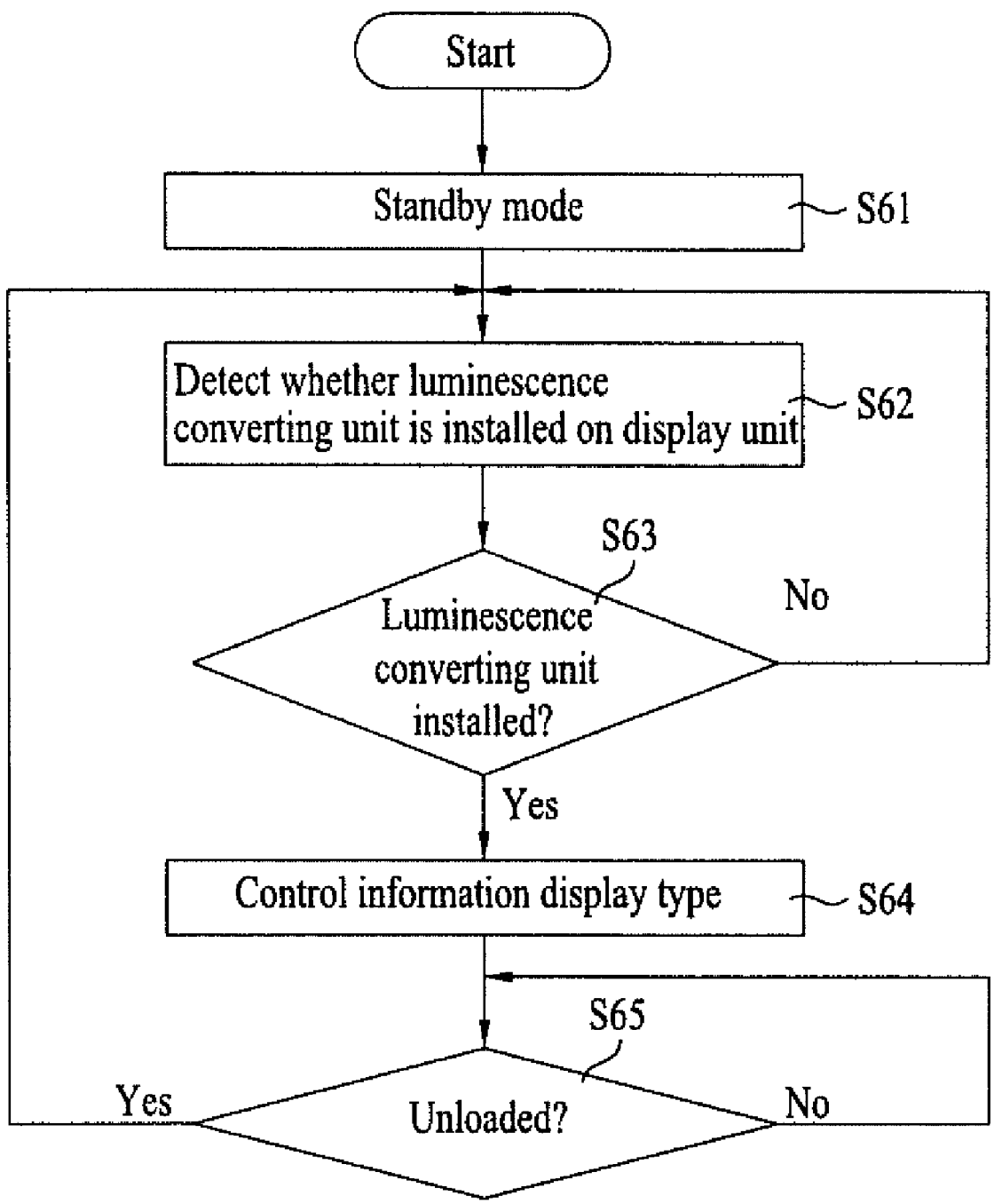
FIG. 6 is a flowchart of a method of controlling an information display operation of a mobile terminal provided with a display device according to a first embodiment of the present invention.

FIG. 6 is a flowchart illustrating a method of controlling an information display operation of a mobile terminal 1 provided with a display device according to a first embodiment of the present invention. As illustrated in FIG. 6, while an operational status of the mobile terminal 1 is in a standby mode (S61), the control unit 55 detects via the detecting unit 53 whether a luminescence converting unit is installed in one of the first 12 and second 14 display units (S62).

If the luminescence converting unit is installed in the first 12 or second 14 display unit (S63), the control unit 55 controls a display type of information displayed on the corresponding display unit (S64). Preferably, the information includes text, an image, and/or an icon indicating a status of the mobile terminal 1 or an event occurrence to be displayed on a screen of the corresponding display unit.

For convenience of explanation, it is assumed that the luminescence converting unit is installed in or mounted on the second display unit 14. The luminescence converting unit covers a portion of the information displayed on the second display unit 14 and the rest of the information is displayed according to the information display type. In this way, an analog type display effect is obtained.

The control unit 55 controls a display type of the information variously to maximize an effect of the luminescence converting unit. The effect of displaying the information on the second display unit 14 as the analog type can be maximized through the control operations of the control unit 55.

The control unit 55 may control a size of the displayed information such that the displayed information is enlarged if the luminescence converting unit is installed on the second display unit 14. The luminescence converting unit blocks a portion of the information and the rest of the information is displayed to lessen the effect of the luminescence converting unit if the size of the information is small. Therefore, the control unit 55 controls the size of the information such that the displayed information is enlarged and is sufficiently displayed as an analog type by the luminescence converting unit.

The control unit 55 may control the displayed information such that the displayed information is displayed on the second display unit 14 as scrolled in one direction. For example, the information for a present time, such as '09:45 a.m.', can be displayed in a manner of scrolling left to right.

The control unit 55 may control the displayed information such that the displayed information is displayed on the second display unit 14 by blinking periodically. For example, the information for a present time, such as '09:45 a.m.', can be displayed such that it blinks.

The control unit 55 may control the displayed information such that the displayed information is displayed on the second display unit 14 with varying brightness. Specifically, the control unit 55 may control the information to be displayed on the second display unit 14 such that the brightness of the information varies between 'fade-out', and 'fade-in'. For example, the brightness of the information for a present time such as '09:45 a.m.', can repeat 'fade-out', to 'fade-in'.

If it is detected via the detecting unit 53 that the luminescence converting unit is removed or dismounted from the second display unit 14 (S65), the control unit 55 no longer controls information display type. The control unit 55 then displays the information as the digital type used prior to loading the luminescence converting unit.

Figure 7A:
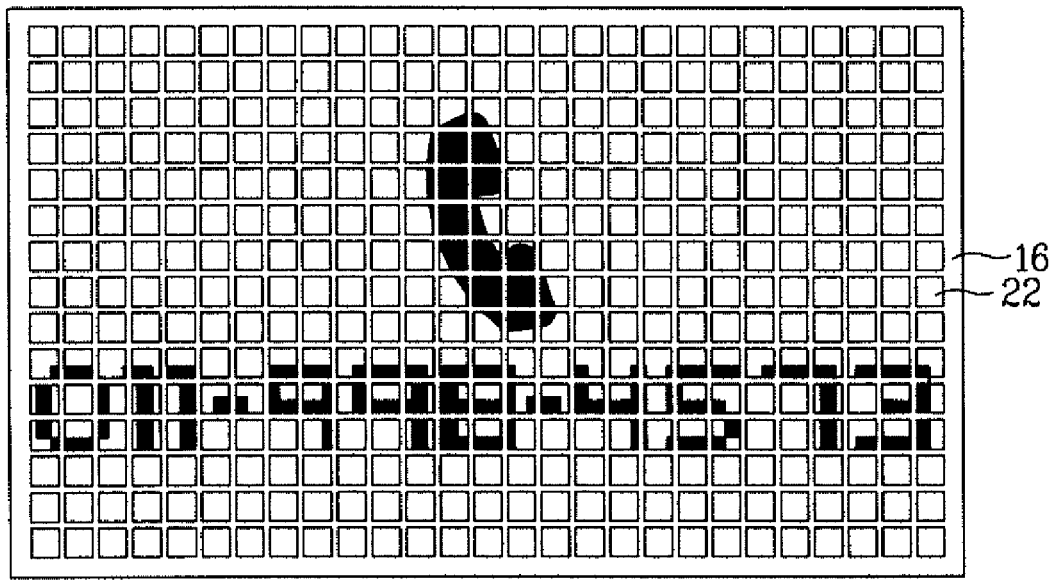
FIGS. 7A to 7C illustrate examples of displaying information through a plate according to the first embodiment of the present invention.
Figure 7B:
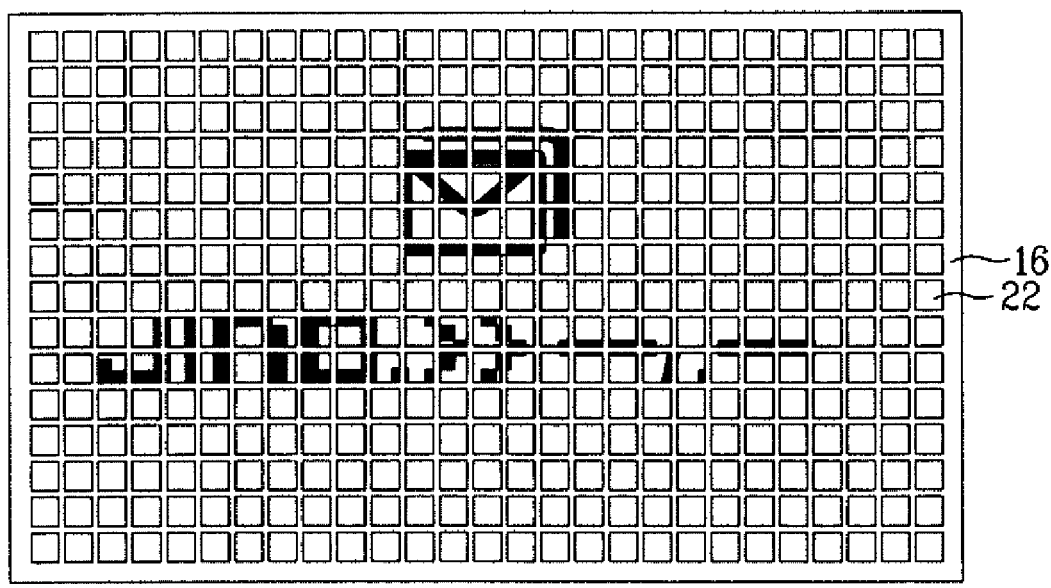
Figure 7C:
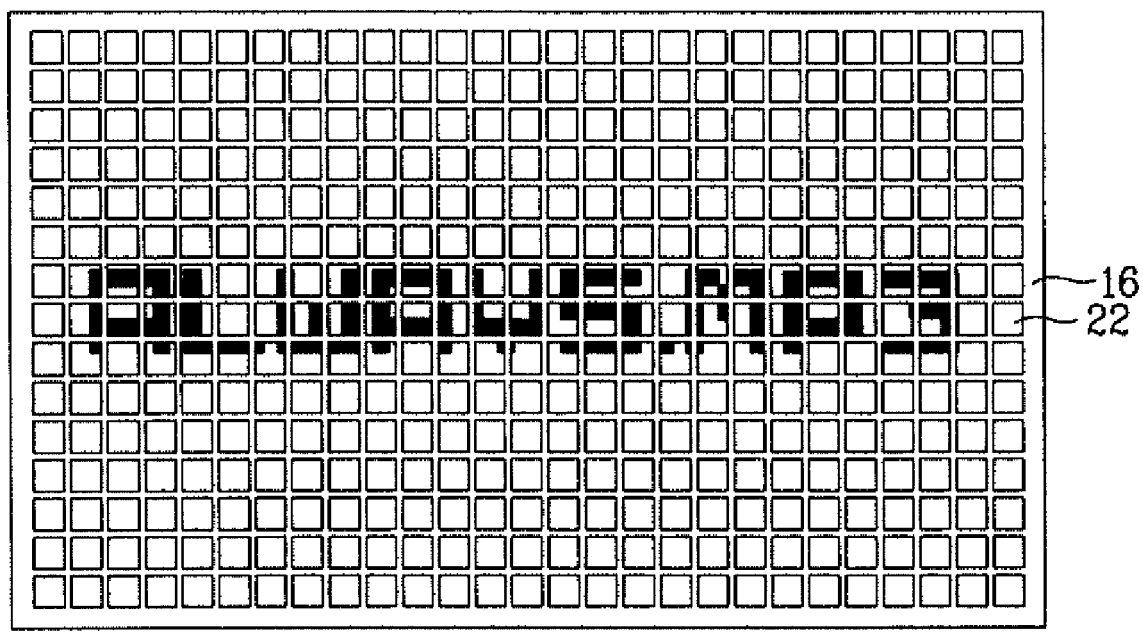

FIGS. 7A to 7C illustrate examples of displaying information through a plate 16 according to the first embodiment of the present invention. As illustrated in FIGS. 7A to 7C, information related to another user, a character message, or a music file name displayed as a digital type looks as if it is displayed as an analog type via the plurality of holes 22 in the plate 16.

FIG. 7A illustrates display of information related to the user of another terminal when a call is connected with the other terminal. FIG. 7B illustrates display of a character message received from another terminal. FIG. 7C illustrates display of a music file name during playback of an MP3 music file.

Second Embodiment

Figure 8:
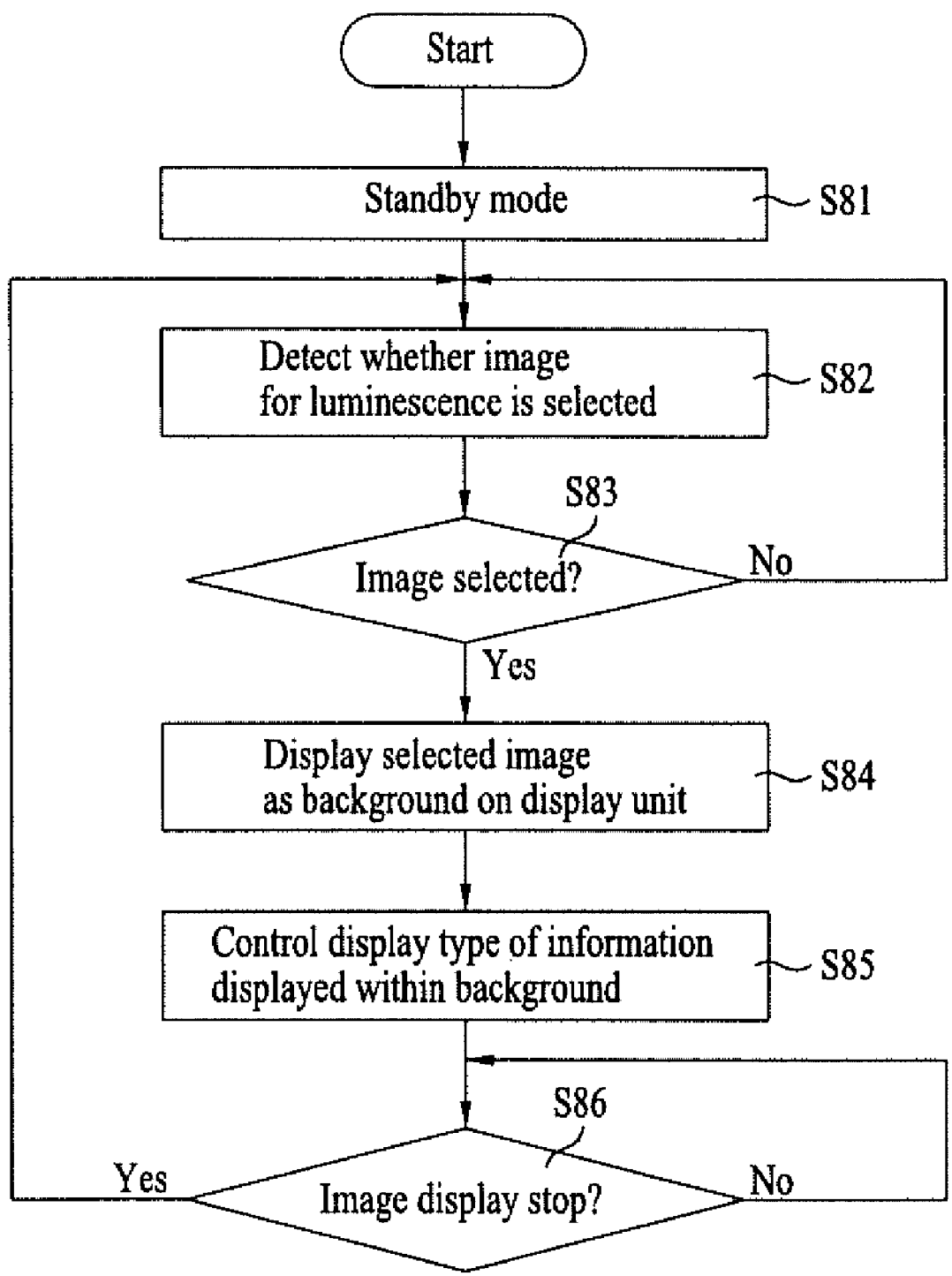
FIG. 8 is a flowchart of a method of controlling an information display operation of a mobile terminal according to a second embodiment of the present invention.

FIG. 8 is a flowchart of a method of controlling an information display operation of a mobile terminal 1 according to a second embodiment of the present invention. As illustrated in FIG. 8, while an operational status of the mobile terminal 1 is in a standby mode (S81), the control unit 55 detects via the input unit 52 whether an image for converting a plane luminescence of the first 12 or second 14 display unit to a plurality of dot luminescences is selected from a plurality of images stored in the storage unit 54 (S82).

Preferably, the image for luminescence conversion image replaces the luminescence converting unit disclosed with respect to the first embodiment of the present invention. The image includes an image corresponding to one of the plates 16 provided with a plurality of holes 22 that was illustrated in FIGS. 3A to 3C. As was done with regard to the first embodiment of the present invention, it is assumed that the luminescence conversion image is selected for the second display unit 14.

If it is determined that the image for the luminescence conversion is selected (S83), the control unit 55 controls the selected image such that it is displayed as a background on the second display unit 14 (S84). The control unit 55 controls a display type of the information displayed within the background (S85) once the selected image is displayed as the background on the second display unit 14.

A portion of the information displayed on the second display unit 14 is covered by the image displayed as the background and the rest of the information is displayed according to the information display type. In this way, an analog type display effect is obtained.

The control unit 55 controls a display type of the information variously to maximize an effect of the image. The control unit 55 may control the information display type in the various ways described with regard to the first embodiment in order to maximize the effect of displaying the information on the second display unit 14 as the analog type.

The control unit 55 may control a size of the displayed information such that it is enlarged. The control unit 55 may control the displayed information such that it is displayed as scrolled in one direction. The control unit 55 may control the displayed information such that it is displayed as blinking periodically. The control unit 55 may control the displayed information such that it is displayed with varying brightness.

If a key signal to stop the display of the image for the luminescence conversion is received via the input unit 52 (S86), the control unit 55 stops displaying the image. The control unit 55 then displays the information as the digital type prior to displaying the image as the background.

Figure 9A:
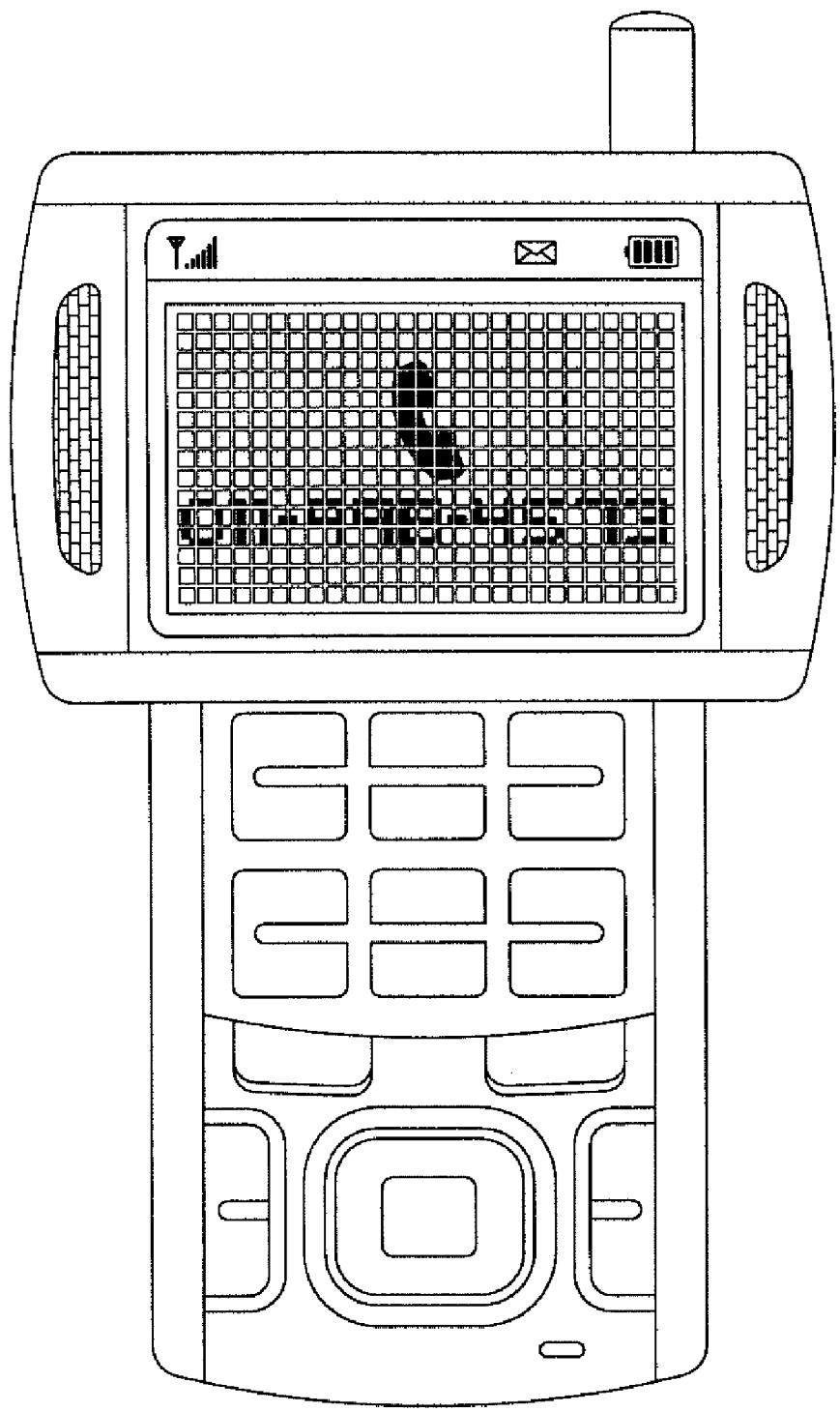
FIGS. 9A to 9C are examples of displaying information through an image for luminescence conversion according to the second embodiment of the present invention.
Figure 9B:
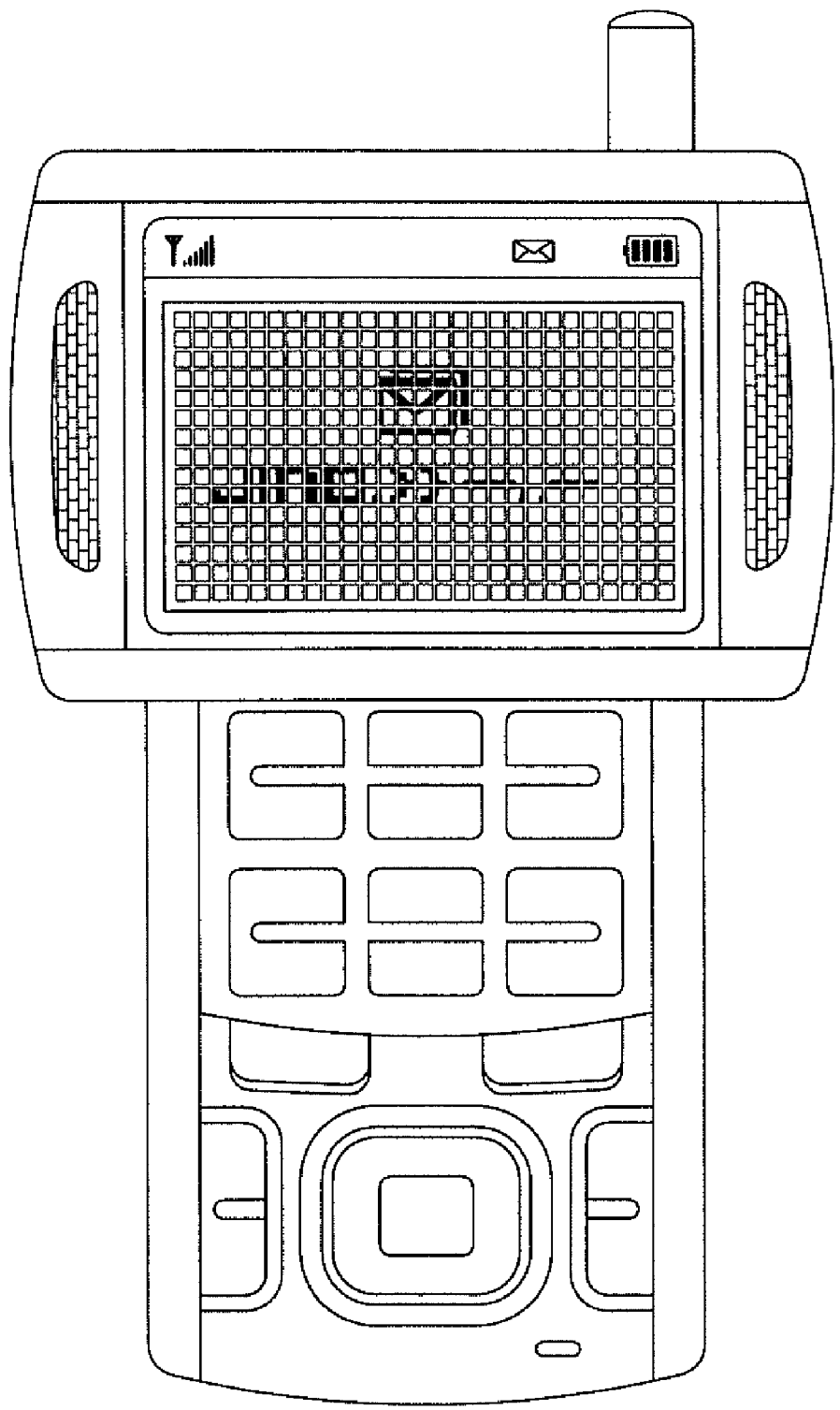
Figure 9C:
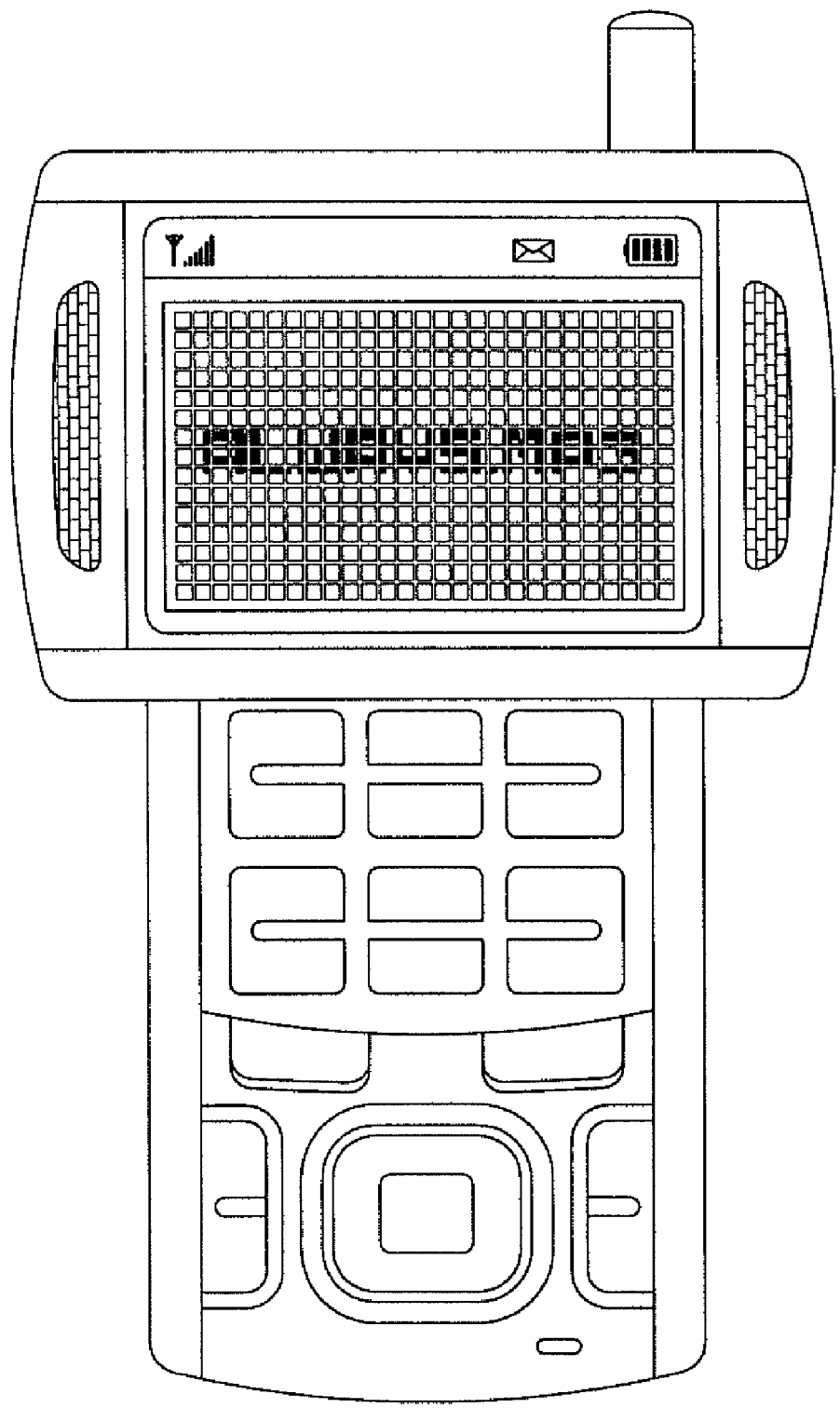

FIGS. 9A to 9C illustrate examples displaying information through an image for luminescence conversion according the second embodiment of the present invention. As illustrated in FIGS. 9A to 9C, information related to another user, a character message, or a music file name displayed as the digital type looks as if it is displayed as an analog type via the image.

FIG. 9A illustrates display of information related to a user of another terminal when a call is connected with the other terminal. FIG. 9B illustrates display of a character message received from another terminal. FIG. 9C illustrates display of a music file name during playback an MP3 music file.

The present invention provides the several effects or advantages. First, a user can be provided with a substantially analog type information display as well as a digital type information display. Second, a display unit may be protected against external exposure that causes particle attachments and scratches by loading a luminescence converting unit, such as a plate and a semitransparent film, on a display unit of a mobile terminal.

It will be apparent to those skilled in the art that various modifications and variations can be made in the present invention without departing from the spirit or scope of the inventions. Therefore, it is intended that the present invention covers the modifications and variations of this invention provided they come within the scope of the appended claims and their equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal, comprising:
a display unit displaying information;
a luminescence conversion unit comprising at least one semitransparent layer on the display unit for converting a luminescence of the display unit to change an appearance of the displayed information when luminescence conversion is performed such that a portion of the information is shown via a partial transmission of light because it is covered by the luminescence conversion unit and a remaining portion of the information is shown via a full transmission of light; and
a control unit controlling the display unit to display the information according to whether the luminescence conversion is performed by enlarging a size of the displayed information if the luminescence conversion is performed, the luminescence conversion converting a luminescence of the display unit to change an appearance of the displayed information, the conversion performed regardless of spectral characteristics of the display unit.

2. The mobile terminal of claim 1, further comprising a detecting unit detecting the presence of the luminescence conversion unit and providing an indication of the detection to the control unit, the luminescence conversion unit performing the luminescence conversion.

3. The mobile terminal of claim 2, wherein the display unit comprises at least one protrusion, the at least one protrusion comprising a groove in which the luminescence conversion unit is detachably installed.

4. The mobile terminal of claim 1, wherein the information comprises at least one of a character, an image, and an icon.

5. The mobile terminal of claim 1, wherein the control unit controls the display unit to scroll the displayed information in a preset direction if the luminescence conversion is performed.

6. The mobile terminal of claim 1, wherein the control unit controls the display unit to blink the displayed information for a preset duration if the luminescence conversion is performed.

7. The mobile terminal of claim 1, wherein the control unit controls the display unit to change a brightness of the displayed information if the luminescence conversion is performed.

8. The mobile terminal of claim 1, wherein the luminescence conversion converts a plane luminescence of the display unit to a plurality of dot luminescences.

9. A method of controlling the display of information in a mobile terminal, the method comprising:
displaying the information on a display unit; and
controlling the display unit to display the information according to whether luminescence conversion is performed,
wherein performing the luminescence conversion comprises:
converting, using a luminescence conversion unit comprising at least one semitransparent layer, a luminescence of the display unit to change an appearance of the displayed information such that a portion of the information is shown via a partial transmission of light because it is covered by the luminescence conversion unit and the rest of the information is shown via a full transmission of light, the conversion performed regardless of spectral characteristics of the display unit; and
enlarging a size of the displayed information.

10. A display device, comprising:
a display unit displaying information;
a control unit controlling the display unit to display the information according to whether luminescence conversion is performed; and
a luminescence conversion unit comprising at least one semitransparent layer on the display unit for converting a luminescence of the display unit to change an appearance of the displayed information when the luminescence conversion is performed such that a portion of the information is shown via a partial transmission of light because it is covered by the luminescence conversion unit and the rest of the information is shown via a full transmission of light,
wherein the luminescence conversion is performed regardless of spectral characteristics of the display unit, and
wherein the control unit further controls the display unit to enlarge a size of the displayed information if the luminescence conversion is performed.

11. A terminal, comprising:
a display configured to display information;
a display cover configured to be positioned over the display such that the display is underlying relative to the display cover, wherein the display cover comprises a plurality of structures shaped to define a corresponding plurality of apertures, wherein the plurality of apertures permit external viewing of portions of the displayed information that is displayed by the underlying display, and wherein the plurality of structures obscure other portions of the displayed information such that the other portions of the displayed information are not externally visible,
wherein the display cover is sized to have a length and a width, wherein a plurality of the apertures exist along the width of the display cover and a plurality of the apertures exist along the length of the display cover to define an array of apertures which are substantially equidistant from one another along the width and substantially equidistant from one another along the length; and
a controller configured to control the display to display the information,
wherein the displayed information comprises a plurality of characters, and
wherein each character of the plurality of characters is sized such that different portions of the character in one direction are externally visible via corresponding different apertures of the plurality of apertures located along the width of the display, and wherein each character of the plurality of characters is sized such that different portions of the character in another direction are externally visible via corresponding different apertures of the plurality of apertures located along the length of the display.

12. The terminal of claim 11, wherein the controller is further configured to:
determine whether the display cover is operatively positioned over the display in a first mode or the display cover is not operatively positioned over the display in a second mode;
during the first mode, cause the display to display the information so that it has a first displayed size; and
during the second mode, cause the display to display the information so that it has a second displayed size, wherein the first displayed size is greater than the second displayed size.

13. A terminal, comprising:
- a display configured to display information;
- a display cover configured to be positioned over the display such that the display is underlying relative to the display cover, wherein the display cover comprises a plurality of structures shaped to define a corresponding plurality of apertures, wherein the plurality of apertures permit external viewing of portions of the displayed information that is displayed by the underlying display, and wherein the plurality of structures obscure other portions of the displayed information such that the other portions of the displayed information are not externally visible,
- wherein the display cover is sized to have a length and a width, wherein a plurality of the apertures exist along the width of the display cover and a plurality of the apertures exist along the length of the display cover to define an array of apertures which are substantially equidistant from one another along the width and substantially equidistant from one another along the length, and
- a controller configured to control the display to display the information,
- wherein the displayed information comprises a icon, wherein
- the icon is sized such that different portions of the icon in one direction are externally visible via corresponding different apertures of the plurality of apertures located along the width of the display; wherein
- the icon is further sized such that different portions of the icon in another direction are externally visible via corresponding different apertures of the plurality of apertures located along the length of the display; and wherein
- remaining portions of the icon are displayed by the display but are not externally visible since such remaining portions are obscured by various portions of the plurality of structures that are shaped to define the plurality of apertures.

* * * * *